Oct. 15, 1935.   C. F. HAUNZ   2,017,150
MANUFACTURE OF METAL OXIDES
Filed July 21, 1933   2 Sheets-Sheet 1
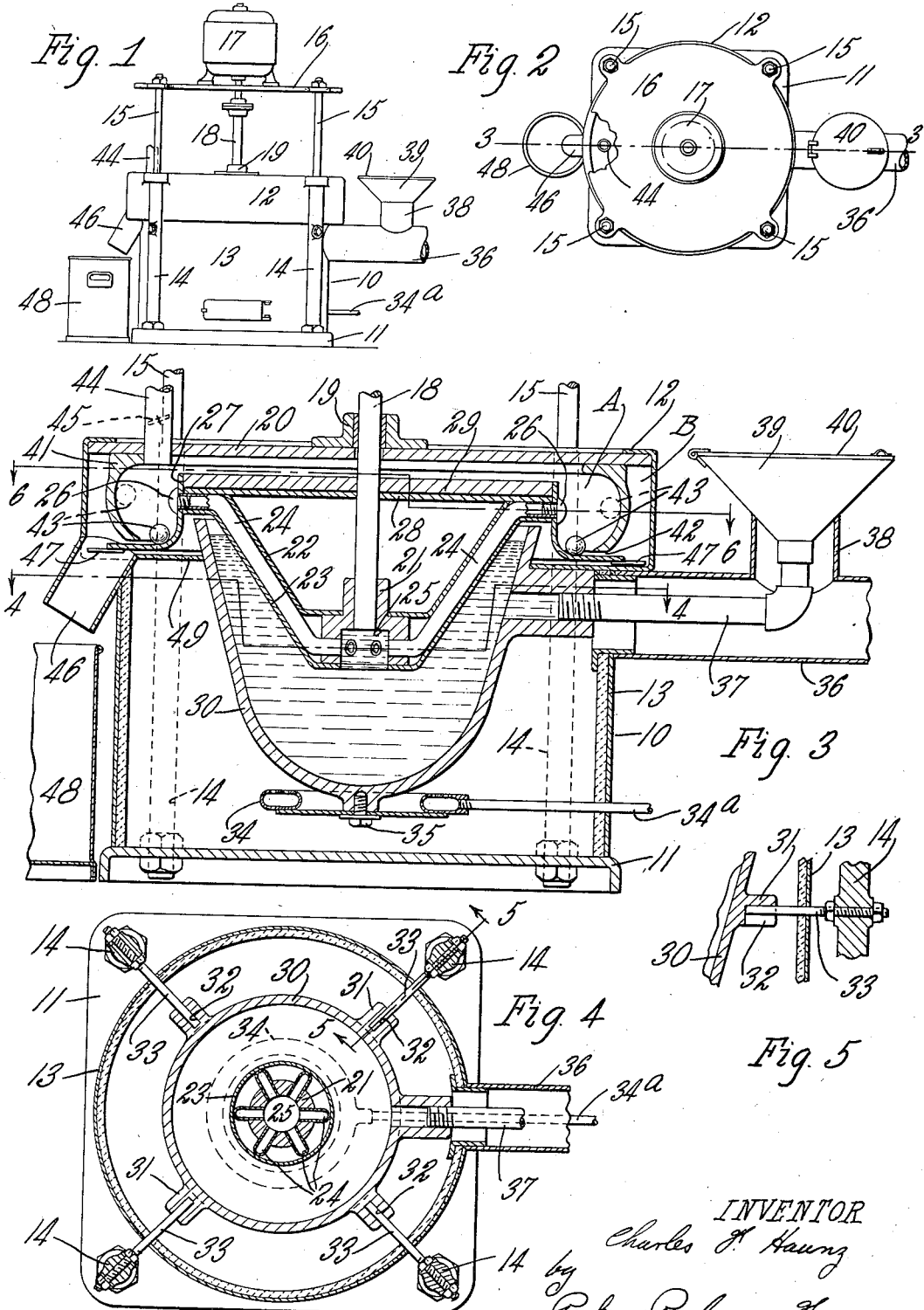

Oct. 15, 1935.                C. F. HAUNZ                2,017,150
                     MANUFACTURE OF METAL OXIDES
                          Filed July 21, 1933           2 Sheets-Sheet 2
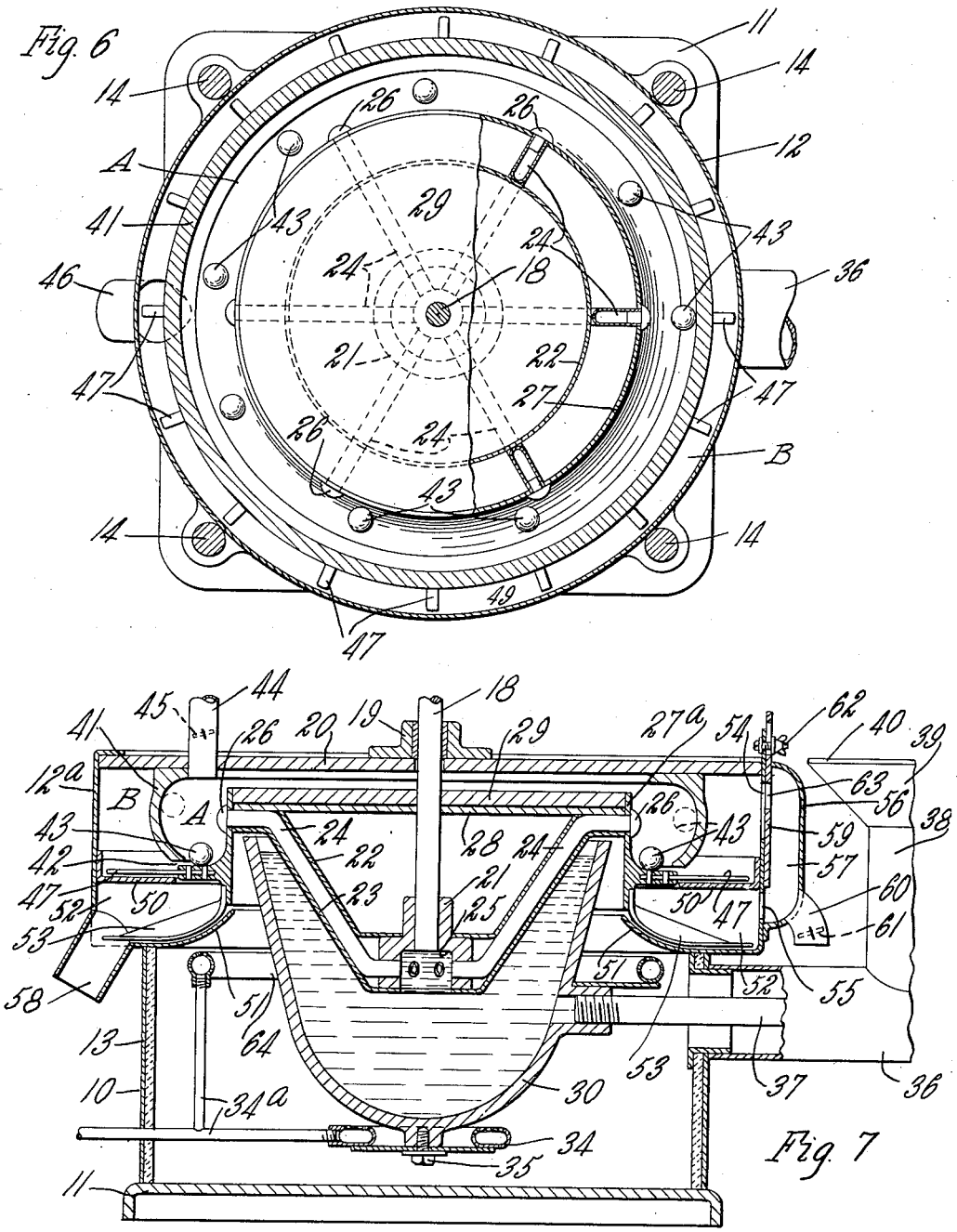
INVENTOR
Charles F. Haunz
by
Parker, Crocknow & Farmer
ATTORNEYS Patented Oct. 15, 1935

2,017,150

UNITED STATES PATENT OFFICE 2,017,150

MANUFACTURE OF METAL OXIDES

Charles F. Haunz, Buffalo, N. Y.

Application July 21, 1933, Serial No. 681,589

28 Claims. (Cl. 23—139)

This invention relates to the manufacture of metal oxides, and particularly to a novel method and apparatus for the manufacture of such oxides. Large quantities of lead oxides are used in the manufacture of storage batteries and also in paints, and in view of the fact that this invention has such a large usefulness in the manufacture of lead oxides, it will be explained in connection with the manufacture of lead oxides, but it will be understood that the invention comprehends also the manufacture of oxides of other metals as well as lead.

Extensive experiments have shown that excellent results can be obtained by using the lower oxides of lead as the active materials of storage battery plates, and various attempts have been made heretofore to manufacture lead oxides in a simple and inexpensive manner, especially for use in batteries, but all of these prior processes necessitate the use of more or less complicated and unsatisfactory operations, such as pulverizing in pebble or hammer mills, or the atomizing of the molten lead by steam or hot air atomizers or by electrolysis. The oxides so formed by prior devices are not uniform in characteristics and, therefore, are unsatisfactory. It is well known that for battery purposes the physical and chemical characteristics of the oxides are of great importance with respect to the capacity and life of a battery.

An object of the invention is to provide an improved process and apparatus for the manufacture of metal oxides, with which oxides of uniform physical and chemical characteristics may be obtained; with which the production of oxides may be continuous; with which either lower or higher oxides may be obtained selectively as desired; with which the purity of the oxides will be excellent; with which the particles of the oxides will be remarkably uniform in the degree of oxidation; with which oxides of different desired characteristics may be rapidly and continuously produced in large quantities at a relatively low cost, and by the use of compact and simple apparatus; with which the cost of the oxide will be unusually small; and with which the oxide so produced will be of high quality.

Various other objects and advantages will be apparent from the following description of two embodiments of the invention, and the novel features will be particularly pointed out hereinafter in connection with the appended claims.

In the accompanying drawings:

Fig. 1 is a side elevation, on a reduced scale, of a machine for forming lead oxides in accordance with this invention and illustrating one embodiment thereof;

Fig. 2 is a plan of the same;

Fig. 3 is a transverse, sectional elevation through the machine, the section being taken approximately along line 3—3, of Fig. 2, but on a larger scale.

Fig. 4 is a sectional plan through the same, the section being taken approximately along the line 4—4 of Fig. 3.

Fig. 5 is a fragmentary sectional elevation through a portion of the machine, the section being taken approximately along the line 5—5 of Fig. 4.

Fig. 6 is a sectional plan of the same, the section being taken approximately along the line 6—6 of Fig. 3; and Fig. 7 is a sectional elevation similar to Fig. 3, illustrating a modified embodiment of the invention and which may be advantageously employed for the manufacture of either the lower or higher oxides, or both, as may be desired.

In the embodiment of the invention illustrated in Figs. 1 to 6, the casing or enclosure 10 for the machine has a suitable base 11 and a removable top portion 12. The base 11 and the top portion 12 are clamped to opposite ends of a tubular cylindrical shell 13 by means of a plurality of posts or studs 14, which pass through and connect the top portion 12 and the base 11. The studs 14 have reduced upstanding extensions 15 which support a plate 16 that serves as a suitable support for a source of power 17. This source of power may be a pulley or gearing, or, as shown, it may be an electric motor, and it drives a shaft 18 which depends from the motor and extends through the top portion 12 of the casing 10. The depending portion of the shaft 18 is rotatably mounted in a suitable bearing 19 that is carried by a top closure plate 20 of the top portion 12 of the casing.

The shaft 18 extends some distance into the casing 10, and at its lower end carries a block or body 21 which mounts two approximately frusto-conical, telescoping shells 22 and 23. A plurality of discharge or spray pipes 24 are disposed between the shells 22 and 23, so as to extend radially from a downwardly opening recess 25 in the lower face of the block 21. The pipes 24 extend upwardly, as well as radially and outwardly, and terminate in spray nozzles or terminals 26 of any suitable design and character. The outer ends of the pipes 24 which carry the nozzles 26 extend through an angular ring 27 which is L-shaped or angular in transverse cross section, the pipes 24 extending through the upstanding arms of the angle or L before connection to the nozzles 26. In fact, the nozzles 26 are preferably removable and, by their attachment to the ends of the pipes, they serve as a convenient means to clamp the ring 27 to the pipes 24 and against the outer peripheral edge of a horizontal flange of the shell 23.

A steel cover 28 rests upon the upper ends of the pipes 24 and fits snugly within the ring 27, and the upper or outer ends of the pipes 24, just before passing through the ring 27, are bent to extend horizontally and outwardly, so that the nozzles discharge in a direction approximately horizontally. A plate or board 29 of heat insulating material also rests upon the steel cover 28 and fits snugly within the upper portion or end of the ring 27. With this arrangement, when the shaft 18 is rotated, the frusto-conical shells 22 and 23, the cover 28, board 29, ring 27, and the pipes 24 carried by the shaft and with it forming a spray unit, will also be rotated about the axis of the shaft 18.

A crucible or pot 30 for the metal to be oxidized is supported within the interior of the casing 10 in any suitable manner. By way of example, this pot or crucible may have lugs 31 extending in a radial direction from the outer wall thereof at intervals around its periphery, and these lugs have slots 32 opening downwardly through their lower faces to receive rods 33 extending radially into the casing, through apertures in the cylindrical shell 13 thereof, and carried by the posts or studs 14. Thus, the pot 30 is applied to the rods 33 by lowering the lugs 31 over the inner ends of the rods 33, until the rods enter the slots 32 of the lugs. A gas or other suitable burner 34 may be attached to the lower end of the pot, such as by a screw 35, so as to supply heat to the lower end of the pot or crucible, and fuse, and keep fused, the metal to be oxidized. Fuel for the burner 34 may be supplied by a pipe 34ª extending from the burner outwardly through the shell 10 to a suitable source of supply.

When the pot or crucible 30 is mounted within the casing 10 in this manner, its upper, open end telescopes somewhat with the frusto-conical shells 22 and 23 which form part of the rotating spray unit that is carried by the shaft 18. Assuming that the pot or crucible 30 is approximately filled with a liquid metal, the block 21 will depend into the liquid, and the liquid will rise into the recess 25 and then pass upwardly in the pipes 24 to some extent while the level within and without the pipes 24 is being equalized. As the shaft 18 rotates, the liquid in the pipes 24 will be subjected to centrifugal force or pressure, which causes the liquid therein to rise further and be discharged at a high velocity through the nozzles 26. The velocity of discharge depends somewhat on the rate of rotation of the shaft 18.

A flue pipe 36 extends outwardly from the side wall 13 of the casing, adjacent the top portion 12, so as to convey away the gases of combustion from the burner 34. A filling pipe 37 extends from the crucible 30 outwardly through the interior of the flue pipe 36, and then upwardly through a vertical branch 38 of the flue pipe, to a funnel shaped reservoir or hopper 39 which is normally closed by a hinged cover 40. The molten metal, which is to be converted into an oxide, is poured into the hopper 39 from which it passes through the pipe 37 to the pot or crucible, and the hot gases of combustion passing through the flue pipe 36 around the pipe 37 and ascending into the vertical branch 38 of the flue pipe, will keep the metal in the pipe 37 and hopper 39 heated to the fusion point so that, by lifting the cover 40 and peering into the hopper 39, one may ascertain the level of the molten metal which is in the pot or crucible 30 of the machine.

The top plate 20 of the casing is provided with a depending flange or wall 41 which is approximately cylindrical and concentric with the axis of the shaft 18. This wall or flange 41 is spaced somewhat from the side wall of the top portion 12, as shown in Fig. 3, and depends into fairly close proximity to, but is slightly spaced from and is just above, the horizontal arm of the ring 27 which rotates with the shaft 18. There will thus be a small slot 42 between the lower end edge of the flange or wall 41 and the upper face of the horizontal arm or flange of the ring 27.

A plurality of balls, or other rolling elements 43, are disposed in the reaction chamber A, which is the chamber between the depending flange or wall 41 and the upright arm or flange of the ring 27. These balls or rolling elements 43 fall by gravity upon the horizontal arm or flange of the ring 27, and when the ring rotates with the shaft 18, the balls 43 will also rotate because they are supported thereon, but when the speed of the balls with the ring 27 increases sufficiently, the balls will be thrown outwardly by centrifugal action, and as they travel outwardly, they will engage and ride up the inner face of the depending flange or wall 41.

Since the balls will have considerable inertia or momentum because of their rotation with the ring 27, as well as the centrifugal force tending to move them outwardly, the balls will not only roll up the flange 41 but also will travel horizontally around the inner face of the flange or wall 41 until their speed decreases and they fall by gravity back upon the ring 27. The ring 27 will then impart further rotation to the balls and throw them outwardly in the same manner, which operation will be repeated automatically during continued or constant rotation of the shaft 18. To facilitate the movement of the balls up the wall or flange 41, the inner face of the flange or wall is made more or less arcuate in transverse cross section, as shown in Fig. 3, and, therefore, as each ball starts outwardly, due to centrifugal action, it will engage the lower portion of the wall or flange 41 which is inclined to the horizontal and will easily ride up the same an extent depending upon the rate of rotation of the shaft 18, at the same time travelling horizontally around the flange or wall 41.

The balls 43 are too large to pass through the slot 42 and, therefore, will always remain within the reaction chamber and move back and forth alternately between the ring 27 and the flange 41. The balls may be of any suitable material, and preferably are of a material which has a higher fusing point than the fusing point of the fluid metal contained in the pot 30. When lead oxide is being made, the balls may be made of hardened steel. Since oxygen is necessary in the formation of an oxide, I may supply free oxygen to the reaction chamber A between the ring 27 and the wall or flange 41 and, therefore, I provide a pipe or conduit 44 opening into the reaction chamber and having a suitable regulating valve or damper 45. The pipe 44 is connected to any source of air, or other gas containing free oxygen, under pressure, such as to a suitable blower, not shown. Air is thus forced through the pipe 44 into the reaction chamber A and then outwardly through the slot 42 into a collecting chamber B, from which this air escapes through a discharge spout 46.

The free oxygen, in contact with the metal which is sprayed against the flange or wall 41, converts the sprayed metal into an oxide which is mechanically loosened and removed by attrition and rolling of the balls 43 thereover. The oxide loosened by the balls 43 will descend by gravity to the horizontal arm of the ring 27, from which it is discharged by centrifugal action, aided by the movement of the air or oxygen carrying gas, through the slot 42. The periphery of the horizontal arm or flange of the ring 27 may be provided with sweeping elements 47 which sweep the floor of the oxide collecting compartment B which is formed between the walls of the top portion 12 and the flange 41, and the sweepings are carried around this collecting chamber until they reach the discharge spout 46 and then are discharged through the spout into a suitable receptacle or receiver 48. The top portion 12 of the casing, it will be understood, has an inturned flange 49 at its lower edge which extends onto the pot 30 so as to shut off the collecting chamber B from the portion of the casing around the lower portion of the pot 30 which is heated by the burner 34.

In operation, let it be assumed that the machine is to be used for the manufacture of lead sub-oxide. For this purpose the pot 30 is filled with molten pig or metallic lead through the hopper 39. The heat from the burner 34 keeps the lead in the pot 30 fluid by keeping its temperature above its fusion point. The shaft 18 is rotated by the motor 17, and by reason of the rotation of the shaft 18 the spraying unit will rotate and will discharge the molten metal as a stream of finely divided particles directed outwardly and somewhat radially of the rotating unit. This sprayed metal will, because of its centrifugal inertia, spatter against the inner face of the depending flange or wall 41, and the impact between the particles of fluid metal and the wall will cause the particles to flatten out on the wall and form thin films thereon or break up into a fine powder, according to the prevailing temperature and velocity.

The balls, rolling over the inner face of the flange wall 41, will mechanically roll or attenuate these films or particles of lead extremely thin so as to present a relatively large surface area exposed to the air of the reaction chamber. This hot metal so exposed to the free oxygen of the air is rapidly converted into a lead oxide which is loosened promptly after being formed by the attrition of the balls rolling thereover, and this oxide which is loosened falls downwardly and drops upon the horizontal flange of the rotating ring 27. The oxide of the metal is then discharged from the ring by centrifugal action through the slot 42. During the spraying of the metal into the reaction chamber, air is preferably added continuously through the pipe 44 in a quantity which is regulated by the damper 45.

The air added in this manner may be of any suitable temperature and in a quantity which is found to give, most effectively, the desired oxide which forms in the reaction chamber. By curtailing the supply of air, the tendency for the lead to form the lower or sub-oxides will be increased, whereas if the temperature and the quantity of the air are increased, there will be more of the higher oxides formed. Further molten metal, or metal in relatively small lumps, will be added to the hopper 39 from time to time to replace that which is sprayed into the reaction chamber A, and the operation of forming the oxides proceeds continuously. The speed of rotation of the shaft 18 is relatively high, so that the particles of fluid metal discharged by the nozzles 26 will strike the wall or flange 41 with considerable force, and by impact be flattened out into thin films.

The shaft 18 preferably rotates at a high speed, so that the velocity of the discharged particles will be relatively high, because the greater the velocity of discharge of the molten metal, the greater the flattening of the particles as they strike the flange or wall of the reaction chamber. When lead is being used in this machine, the balls 43 may be hardened steel balls, and some of the positions of these balls, when rolling on the wall 41, are shown by the dash lines in Fig. 3. As the balls rotate with the ring 27, they gain momentum, and after reaching a certain speed they leave the ring 27 and fly against the flange or wall 41 and roll up and around the same until their kinetic energy is spent, whereupon they drop back by gravity upon the ring 27 and the action is repeated. The running of these balls around the film covered wall or flange 41 will eliminate the accumulation of metal particles at any one part of the wall, and at the same time will act as a mill and cause an efficient intermixing of the finely divided metal with hot air, thus producing a desired degree of oxidation.

By changing the nozzles on the jets and regulating the quantity and temperature of the air added to the reaction chamber, the degree of oxidation, as well as the physical characteristics of the oxide product, can be regulated to a considerable extent. The intake ends of the discharge pipes 24 open into the pot below the upper level of the metal in the pot in order to prevent any dross particles of the molten lead from entering and clogging the pipes 24 or the nozzles 26. Assuming that the nozzles 26 move in a closed path having a circumference or length of 10 feet, and also assuming that the shaft 18 is rotating at approximately 1725 revolutions a minute, then the velocity of the metal striking the wall or flange 21 will be approximately 280 feet per second. If the motor speed is increased to 3450 R. P. M., then the velocity of the metal particles striking the wall or flange 41 will be approximately 560 feet per second.

Some of the molten metal impacted against the flange or wall also disintegrates into a very fine powder and I have found that by altering the bore of the nozzles and changing the velocity and temperature of the metal, a wide variation of the physical structures of the oxides may be obtained, and different degrees of oxides may also be obtained. Thus, with this device the production of metal oxides is continuous and rapid and the character of the oxides is actively controlled.

Referring now to Fig. 7, I have illustrated another embodiment of the invention which is similar to the embodiment of Figs. 1 to 6 except that the top portion 12 of the casing is made deeper and provided with a horizontal, inwardly extending flange 50 which corresponds to the flange 49 of Figs. 1 to 6. The side wall of the top portion 12a, however, continues downwardly and then inwardly to provide a flange 51 which, at its inner edge, curves upwardly into close proximity to the lower edge of the ring 27a which corresponds to the ring 27 of Figs. 1 to 6. The flanges 50 and 51 and the side wall of the top portion 12a, together with the ring 27ª, form a special oxidizing chamber 52.

A plurality of fingers or arms 53 extend from the ring 27ª into this special oxidizing chamber, and downwardly along, and in close proximity to, the flange 51, and serve as agitators for a purpose which will appear presently. Instead of discharging the oxide directly from the collecting or delivery chamber B which is formed between the flange 41 and the side wall of the top portion 12ª of the casing, the delivery spout 46 of Figs. 1 to 6 is omitted, and instead the side wall of the top portion 12ª is provided with an opening or aperture 54 near the upper part thereof and is also provided below the flange 50 with another opening or aperture 55.

A small, channel shaped shell or casing 56 is applied to the side wall of the top portion 12ª and provides therewith a conduit 57 which connects the apertures 54 and 55 so as to conduct air and oxide from the collecting or delivery chamber B, above the flange 50, into the special oxidizing chamber 52 which is below the flange 50. A delivery spout 58 leads from the lower part of the special oxidizing chamber at a point opposite to or remote from the conduit 57, and deposits the oxide in a suitable receptacle, the same as in Figs. 1 to 6.

A shutter 59 is provided to control the aperture or opening 55 and is operable from the exterior of the conduit 57. The shutter 59 may be of any suitable type but is shown as a plate slidable vertically on the side wall of the top portion 12ª and is clamped in different adjusted positions thereon by a bolt 62 which passes through a slot in the shutter plate and an aperture in a struck up ear of the wall of the top portion 12ª. The shutter plate 59 is provided with an aperture 63 which is always aligned with the opening 54, and by shifting the plate 59 downwardly, it will cover to different, desired extents the opening 55 leading into the special oxidizing chamber. The conduit 57 also is provided with a branch dsicharge spout 60 having therein a regulating damper 61.

The operation of the embodiment shown in Fig. 7 is similar to that explained for Figs. 1 to 6, except that the oxide discharged through the slot 42, instead of being discharged immediately through the spout 46, as in Figs. 1 to 6, is agitated by sweeping fingers 47 and thereby thrown into suspension in the air entering this collecting or delivery chamber B. This air, with suspended particles of the oxide, passes upwardly through the opening 54 and into the conduit 57 and then can either be discharged directly through the branch 60 when the damper 61 is opened and the shutter plate 59 is shifted into closed position across the opening 55, or if the damper 61 is closed and plate 59 is in its upper or open position, the air and oxide will be carried together into the special oxidizing chamber 52 where the air and oxide particles will be kept in agitation by the fingers 53 so as to ensure an intimate mixture between the fine particles of oxide and the air, thereby ensuring further oxidation of the metallic oxide, such as to raise a lower oxide to a higher oxide. This higher oxide is then discharged through the spout 58 into a suitable receptacle.

If desired, one may move the plate 59 and damper 61 both into open position and thus have a lower oxide of the metal discharged through the spout 60 and a higher oxide of the same metal discharged concurrently through the spout 58.

While the special oxidizing chamber 52 will be heated more or less by the heat obtained from the chamber surrounding the pot, it may be desirable, in some instances, to heat further this special oxidizing chamber and, for that purpose, I may also provide an annular burner ring 64 disposed immediately below the flange 51 so as to apply additional heat directly to that flange forming the bottom wall of this special chamber 52.

A machine, such as shown in either embodiment of the invention, is compact and occupies a minimum of floor space, yet, because of its continuous operation, will produce relatively large quantities of oxides in a given period of time, and the oxides will be uniform in characteristics and of a high quality.

It will be obvious that various changes in the details, which have been herein described and illustrated in order to explain the nature of the invention, may be made by those skilled in the art within the principle and scope of the invention as expressed in the appended claims.

I claim:—

1. The process of preparing a metal oxide which comprises fusing the metal whose oxide is desired, discharging the fused metal while fluid in finely divided particles against a wall with sufficient force to cause the particles to flatten out in thin films on said wall, exposing said films while on said walls to free oxygen to form an oxide of the metal of the films, separating the oxide from the films continuously as the oxide forms, and collecting the separated oxide.

2. The process of preparing a metal oxide which comprises fusing the metal whose oxide is desired, discharging the fused metal while fluid in finely divided particles against a wall with sufficient force to cause the particles to flatten out in thin films on said wall and adhere thereto, mechanically attenuating said films on said wall, and exposing said attenuated films while still hot to free oxygen to form an oxide of the metal of the films.

3. The process of preparing a metal oxide which comprises fusing the metal whose oxide is desired, discharging the fused metal while fluid in finely divided particles against a wall with sufficient force to cause the particles to flatten out in thin films, exposing said films to free oxygen to form an oxide of the metal of the films and mechanically attenuating the films by pressure approximately normal to the faces of the films, during such exposure to oxygen to increase the area of the films exposed to the oxygen and also to remove the oxide by abrasion promptly following its formation.

4. The process of preparing a metal oxide, which comprises fusing the metal whose oxide is desired, discharging the fused metal, while fluid, in finely divided particles with substantial force against an upright wall to cause the particles to flatten out by impact and form adherent films on said wall, exposing said film while still hot to free oxygen, and mechanically pressing said films against said wall to attenuate them and loosen the oxide which forms on said films, which then drops by gravity and exposes further film surface area.

5. The process of preparing a metal oxide which comprises fusing the metal whose oxide is desired, discharging the fused metal, while fluid, in finely divided particles with force against a wall to cause the particles to flatten out by impact and form adherent films of metal on said wall, oxidizing said films while still hot with free oxygen, and repeatedly rolling said films to increase the exposed surface area thereof and mechanically loosen and remove from the films the oxide promptly after it forms.

6. The process of preparing a metal oxide which comprises fusing the metal whose oxide is desired, discharging the fused metal, while fluid, in finely divided particles with force against a wall to cause the particles to flatten out by impact and form adherent films of metal on said wall, exposing said films while still hot to free oxygen, and regulating the amount of free oxygen and temperature to control the character of metal oxide formed on said films.

7. The process of preparing a metal oxide, which comprises fusing the metal whose oxide is desired, whirling the fluid metal and discharging it in fine particles by centrifugal force against a wall whereby the inertia of the particles of fluid metal striking the wall will flatten out the particles into minute films of metal adhering to said wall, exposing said films while hot to free oxygen, and regulating the amount and temperature of the free oxygen until the desired oxide forms on said films.

8. The process of preparing a metal oxide, which comprises fusing the metal whose oxide is desired, impacting the fused metal in fluid form and in finely divided particles against a wall with considerable velocity to cause the particles of fluid metal to flatten out and form films when engaging said wall, oxidizing said films while on said wall with free oxygen to cause the formation of an oxide, and removing the oxide promptly after formation by mechanical action on said films on said wall.

9. The method of preparing a metal oxide, which comprises fusing the metal whose oxide is desired, applying the fused fluid metal as a thin adhering film to a wall, with a minimum of moisture, oxidizing the film on said wall in a confined atmosphere, and regulating the quantity of free oxygen to form a low oxide of said metal.

10. The method of preparing a metal oxide, which comprises fusing the metal whose oxide is desired, applying the fused fluid metal as a thin attenuated, adherent film to a wall to form a thin film of the metal on said wall, with a minimum of moisture, exposing the film on said wall while hot to the action of free oxygen to form a low oxide of said metal, and regulating the temperature of the oxygen in contact with said film.

11. The method of preparing a metal oxide, which comprises fusing a metal whose oxide is desired, forcing said fluid metal in the form of finely divided particles at a high velocity in a progressing path against a relatively stationary wall, and forming on said wall thin attenuated, adherent films of the metal, oxidizing the films on said wall continuously with free oxygen, and removing the oxides of said metal by mechanical attrition on said films along said path.

12. The process of preparing a metal oxide, which comprises fusing the metal whose oxide is desired, discharging the fused metal while fluid in finely divided particles with force against an upright wall, and progressively along said wall, to cause the particles to flatten out by impact with said wall and form attenuated films thereon, exposing said films to free oxygen to cause the formation of oxides of the metal on said films, mechanically working said films to attenuate them and loosen the oxide which forms on said films, so that the oxide will drop by gravity from said wall, placing said oxide in suspension in a gaseous body containing free oxygen, and heating said gaseous body with suspended oxides to cause the formation of higher oxides of the same metal.

13. An oxide creating machine comprising a chamber, means for discharging fluid metal, whose oxide is desired, as a fine spray and with considerable force against a wall of said chamber, whereby the particles of fluid metal in said spray will flatten out by impact and form thin films of metal adherent to said wall, means for supplying free oxygen to said chamber along said wall whereby the metal films on said wall will be converted to an oxide, and means adapted to press said films directly against said wall for separating and removing the oxide from said walls and collecting it without any substantial portion of unoxidized metal.

14. An oxide creating machine comprising a chamber, means for discharging fluid metal, whose oxide is desired, as a fine spray and with considerable force against a wall of said chamber, whereby the particles of fluid metal in said spray will flatten out by impact and form thin films of metal adherent to said wall, means for supplying free oxygen to said chamber along said walls whereby the metal films on said wall while still hot will be converted to an oxide, means adapted to roll said films against said wall and thereby mechanically working and reworking said films to attenuate said films and remove oxide from the films as formed, and means for collecting the removed oxide.

15. An oxide creating machine comprising a chamber, means for discharging fluid metal, whose oxide is desired, as a fine spray and with considerable force against a wall of said chamber, whereby the particles of fluid metal in said spray will flatten out by impact and form thin adherent films of metal on said wall, means for passing through said chamber a gas containing free oxygen, whereby the metal films on said wall will be converted to an oxide, and means adapted to regulate and vary the quantity of free oxygen passing through said chamber, to determine the particular oxide which is formed.

16. An oxide forming machine comprising an approximately closed casing having a wall inclined to the horizontal, means in said casing for discharging a fused metal, whose oxide is desired in fluid form against and progressively along said wall and as a fine spray and with a substantial velocity, means for admitting free oxygen to the portion of said casing along the face of said wall upon which metal is discharged, and means moving progressively over said wall and adapted to mechanically roll, into attenuated films, the particles of metal discharged on said wall, whereby the oxide formed by the action of said oxygen on said films will be mechanically removed by the rolling and will fall by gravity, and means for collecting the oxides falling from said wall substantially free of unoxidized metal.

17. An oxide forming machine comprising a casing having a cylindrical wall inclined to the horizontal, a pot for fluid metal disposed in said casing, means rotating in said casing and extending into said pot for discharging the fluid fused metal in said pot as a fine spray progressively along said wall, means in said casing for heating the metal in said pot to keep it fluid, a rotating member disposed below and approximately within the space encompassed by said wall, and extending into close proximity to, but spaced slightly from, the lower edge of said wall, and a rolling element disposed on said rotating member and free thereof, said rotating member and said wall together forming a chamber which confines said rolling element therein and from which the oxide escapes through the space between said member and wall, whereby said member will receive the rolling element as it falls from said wall, carry it with it during rotation and discharge it against said wall by centrifugal force, repeatedly, whereby said element will be rolled across said wall to attenuate the film formed by the discharged particles on the wall and to mechanically remove any oxide forming on the film.

18. An oxide forming machine comprising an upright cylindrical wall, means for discharging a fluid fused metal, whose oxide is desired, as a fine spray on the inner face of said cylindrical wall, an annular member approximately within the space enclosed by said wall and rotating about the axis of the cylinder of said wall, means for admitting air to the space adjacent said wall, a free rolling element placed on said member, and thrown therefrom by centrifugal action against said wall, whereby said element will roll along the wall, attenuate into thin films the metal particles discharged on said wall, and mechanically remove oxides of the metal forming such films, said member extending into close proximity to but slightly spaced from said wall and forming with said wall a chamber in which said element is confined, means for collecting the oxide so removed and placing it in suspension in said air, and means for heating and agitating said air with its suspended oxide to convert the oxide into a different form of oxide.

19. An oxide forming machine comprising an enclosing casing, a depending cylindrical wall within said casing, means in said casing and rotating about an axis concentric with said wall for discharging a fused metal in fluid form and in finely divided particles against the side face of said wall, a member also rotating about substantially the same axis and adjacent the lower edge of said wall but spaced therefrom, a rolling element disposed on said member and thrown therefrom by centrifugal action in a direction to ride up and peripherally along the inner face of said wall so as to roll out into films the particles of fluid metal discharged on said wall and to mechanically remove oxides of the metal of said film, said member and wall together forming a chamber in which said element is confined, means associated with said member for collecting the oxide falling from said wall, and means for admitting a gas containing free oxygen into the interior of said casing.

20. An oxide forming machine, comprising a casing having a depending cylindrical flange spaced from its outer wall, a member rotating concentrically of said flange and having a portion extending radially inwardly from the lower edge of said flange and then vertically, means associated with said member for spraying a fused metal, whose oxide is desired, in fine particles against the inner face of said flange, a rolling element disposed on said member and face thereof so as to be thrown, by centrifugal action received from said member, against said wall, and to receive it from said wall by gravity, said wall and member together forming a chamber in which said element is confined by gravity, means for admitting a current of air to said casing within said flange whereby the oxygen of the air will oxidize the sprayed metal on said flange and the rolling element will attenuate into thin films the metal sprayed on said flange and remove oxides of the film which form, the oxides falling by gravity upon said member and being discharged by said member beneath said flange through centrifugal action, said casing having a wall below said member and forming therewith a delivery chamber into and through which air passes through the space between said member and said flange, said casing having another and lower wall extending radially inwardly toward said member and with said member, said casing, and first wall forming a special oxidizing chamber, and said member having an agitating projection extending into said special chamber and moving therein, conduit means connecting said delivery chamber and said special chamber, whereby the oxide discharged into said delivery chamber will be carried in suspension in the air therein and be conveyed to said special oxidizing chamber and there kept in agitation while a higher oxide is being formed, and means for discharging air and oxide from said special chamber.

21. An oxide forming machine comprising a casing having a cylindrical wall at a substantial angle to the horizontal, means within said casing for discharging the metal, whose oxide is desired, in fluid form as a fine spray against the inside face of said wall and progressively therealong in a circumferential direction, a rotating member disposed below and approximately within the space encompassed by said wall, and extending into close proximity to, but spaced slightly from, the lower edge of said wall, and a rolling element propelled by said rotating member and free to roll along and against said wall, said rotating member, said wall and said casing together defining a reaction chamber from which the oxide, loosened by said rolling element, escapes through the space between said member and said wall.

22. An oxide forming machine comprising a casing having a cylindrical wall at a substantial angle to the horizontal, means within said casing for discharging the metal, whose oxide is desired, in fluid form as a fine spray against the inside face of said wall and progressively therealong in a circumferential direction, means cooperating with said wall and casing for defining a reaction chamber along said wall, and means in said chamber and pressing against said wall face in a direction approximately normally to that face for mechanically working the sprayed metal on said wall into thin films and loosening any oxide on said films, said chamber having an opening at the bottom thereof through which oxide loosened by the working means may escape and be collected.

23. An oxide forming machine comprising a casing having a cylindrical wall at a substantial angle to the horizontal, means within said casing for discharging the metal, whose oxide is desired, in fluid form as a fine spray against the inside face of said wall and progressively therealong in a circumferential direction, means cooperating with said wall and casing for defining a reaction chamber along said wall, means in said chamber and pressing directly against said wall for mechanically working the sprayed metal on said wall into thin films and loosening any oxide on said films, said chamber having an opening at the bottom thereof through which oxide loosened by the working means may escape and be collected, and means for supplying a current of air to said chamber at a point spaced from said opening, whereby air will move through said chamber in contact with said films to oxidize the same.

24. An oxide forming machine, comprising a casing having a cylindrical wall at a substantial angle to the horizontal, a pot in said casing and containing fused metal to be oxidized, a centrifugal device dipping into said fused metal and operable to elevate said fused metal and discharge it as a fine spray and with considerable velocity against the inner face of said wall progressively in a direction circumferentially along said wall, means for circulating a current of air along said wall, means operated by said device for rolling the sprayed metal along said wall for attenuating the sprayed metal into thin films which are oxidized by said air, said rolling removing the oxide of the films from the films continuously and exposing fresh unoxidized film surfaces, and means for collecting the oxides falling from said wall.

25. An oxide creating machine comprising a chamber having an upstanding wall extending continuously around said chamber, means in said chamber, rotating in the same direction continuously and adapted to spray a fluid metal, whose oxide is desired, in finely divided form and with considerable force against said wall, to cause said metal to adhere to said wall, and means moving progressively and continuously in the same direction along said wall and adapted to press the metal adherent to said wall, directly against said wall, whereby the metal adherent on said wall will be attenuated into films and the oxide forming thereon removed continuously.

26. An oxide creating machine comprising a chamber having an upstanding wall extending continuously around said chamber, a centrifugal spraying device rotatably mounted in said chamber, continuously rotating in the same direction, and adapted to spray fluid metal whose oxide is desired against said wall progressively and continuously, and means in said chamber, rotating continuously in the same direction, and adapted to roll the sprayed metal adhering to said wall, against said wall.

27. The process of preparing a metal oxide which comprises fusing the metal whose oxide is desired, applying the fused metal in fluid condition against a wall to form adherent metal films on said wall, exposing said films while on said walls to free oxygen to form an oxide of the metal, and mechanically and repeatedly working said films on said wall and while hot to remove therefrom the oxide and expose fresh metal for oxidation.

28. The process of preparing a metal oxide which comprises fusing the metal whose oxide is desired, continuously discharging the fused metal in fluid condition against a wall to form adherent metal films on said wall, passing air in contact with said films to oxidize the films, mechanically working said films on said wall and while hot to remove therefrom the oxide and expose fresh metal for oxidation, and regulating the quantity and temperature of said air.

CHARLES F. HAUNZ.